United States Patent [19]

Izumi et al.

[11] Patent Number: 5,242,981
[45] Date of Patent: Sep. 7, 1993

[54] RESIN COMPOSITION

[75] Inventors: Mitsuhiko Izumi; Kenji Yoshino; Tadahiro Wakui, all of Chiba, Japan

[73] Assignee: Kawasaki Steel Corporation, Hyogo, Japan

[21] Appl. No.: 752,999

[22] Filed: Sep. 3, 1991

Related U.S. Application Data

[63] Continuation of Ser. No. 469,025, Jan. 23, 1990, abandoned.

[30] Foreign Application Priority Data

Jan. 26, 1989 [JP] Japan ................................. 1-16934

[51] Int. Cl.⁵ ................... C08L 67/02; C08L 67/03; C08L 67/04; C08L 69/00
[52] U.S. Cl. ................................. 525/133; 525/67; 525/68; 525/146; 525/147; 525/148; 525/439
[58] Field of Search ............... 525/133, 146, 148, 439, 525/67, 147

[56] References Cited

U.S. PATENT DOCUMENTS

| | | | |
|---|---|---|---|
| 4,460,735 | 7/1984 | Froix | 525/439 |
| 4,859,738 | 9/1989 | Farah | 525/67 |
| 4,945,130 | 7/1990 | Genz et al. | 525/67 |

FOREIGN PATENT DOCUMENTS

| | | |
|---|---|---|
| 0044175 | 1/1982 | European Pat. Off. |
| 0297353 | 1/1989 | European Pat. Off. |
| 0300751 | 1/1989 | European Pat. Off. |
| 57-40551 | 3/1982 | Japan |
| 63-6046 | 1/1988 | Japan |
| 63-61045 | 3/1988 | Japan |
| 1-121357 | 5/1989 | Japan |
| 1-193351 | 8/1989 | Japan |
| 1-292057 | 11/1989 | Japan |

Primary Examiner—Patricia A. Short
Attorney, Agent, or Firm—Oliff & Berridge

[57] ABSTRACT

The improved resin composition comprises:

(A) a melt-workable liquid-crystal polyester resin obtained by polymerizing components selected from the group consisting of a dicarboxylic acid represented by the general formula (a) HOOC—$R_1$—COOH, a diol represented by the general formula (b) HO—$R^2$—OH, and an oxycarboxylic acid represented by the general formula (c) HO—$R^3$—COOH;

(B) a polycarbonate resin having a recurring unit represented by the general formula:

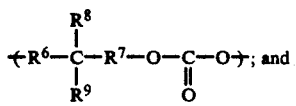

(C) a polyolefin and/or an olefinic copolymer, and the polyolefin and/or olefinic copolymer (C) is contained in an amount of 1–15 parts by weight per 100 parts by weight of a resin consisting of 95–5 wt % of the liquid-crystal polyester resin (A) and 5–95 wt % of the polycarbonate resin (B). This resin composition is balanced between various physical properties including moldability, heat resistance, impact resistance, dimensional stability and stiffness.

9 Claims, No Drawings

RESIN COMPOSITION

This is a continuation of application Ser. No. 07/469,025, filed Jan. 23, 1990, now abandoned.

BACKGROUND OF THE INVENTION

The present invention relates to a resin composition that is improved in moldability, impact resistance, heat resistance, dimensional stability and stiffness or rigidity.

Liquid-crystal polyesters can be molded at comparatively low temperatures and yet they exhibit high heat resistance and are superior in mechanical properties, chemical resistance and dimensional stability. Because of these features, liquid-crystal polyesters hold much promise as materials that can be used in a broad range of applications. However, liquid-crystal polyesters are known to have their own problems such as anisotropy that occurs in their mechanical properties, shrinkage during molding, etc. on account of their high degree of orientation, as well as propensity to spalling on the surface of a molded article on account of its pronounced skin-core structure. With a view to solving these problems, it was proposed that inorganic fillers such as glass fibers (GF) and minerals be compounded into liquid-crystal polyesters [see "Journal of Materials Science", 21 (1986), pp. 2889-2900]. This method is not effective unless the filler is incorporated in a substantial amount ($\geq 20$ vol %) but then problems arise such as the wear of the screw in the molding machine and the increase in the brittlness of the molded article. In order to solve these problems, the anisotropy of the matrix resin itself must be reduced.

In an attempt to meet this need, it has been proposed that liquid-crystal polyester resins be mixed with other ingredients to provide liquid-crystal resin compositions (see Japanese Patent Public Disclosure (KOKAI) Nos. 57-40551 and 63-6046). However, these compositions experience a marked drop in their mechanical strength properties, in particular, Izod impact strength, within the range where improved anisotropy can be attained and hence, they have not yet reached the commercial stage.

The present inventors conducted intensive studies in order to improve the impact strength of a composition consisting of a liquid-crystal polyester resin and a polycarbonate resin. As a result, they found that when a small amount of a polyolefin and/or an olefinic copolymer was added to the mixture of a liquid-crystal polyester resin and a polycarbonate resin, the heat resistance and dimensional stability of the mixture were retained and yet its impact strength was significantly improved. The present invention has been accomplished on the basis of this finding.

SUMMARY OF THE INVENTION

The present invention provides a resin composition which comprises:

(A) a melt-processable liquid-crystal polyester resin that is capable of forming an anisotropic molten phase at a temperature not higher than 350° C. and that is obtained either by polymerizing at least two components in combination which are selected from the group consisting of a dicarboxylic acid represented by the general formula (a) HOOC—$R^1$—COOH, a diol represented by the general formula (b) HO—$R^2$—OH and an oxycarboxylic acid represented by the general formula (c) HO—$R^3$—COOH, where $R^1$, $R^2$ and $R^3$ each represents at least one group selected from among a divalent aromatic hydrocarbon group, group $R^4$—X—$R^5$ (where $R^4$ and $R^5$ are each a divalent aromatic hydrocarbon group, and X is an oxygen atom, a sulfur atom, a sulfonyl group, a carbonyl group, an alkylene group, an ester group or a direct bond), a xylylene group and a divalent aliphatic hydrocarbon group, provided that one or more hydrogen atoms in $R^1$, $R^2$, $R^3$, $R^4$, $R^5$ or on the aromatic ring of the xylylene group may be replaced by a substituent) or by homopolymerizing an oxycarboxylic acid of the general formula (c);

(B) a polycarbonate resin having a recurring unit represented by the following general formula:

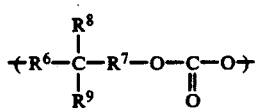

where $R^6$ and $R^7$ each represents at least one member selected from among naphthylene, phenylene, a halogen-substituted phenylene and an alkyl-substituted phenylene, and $R^8$ and $R^9$ each represents at least one member selected from among a hydrogen atom, a hydrocarbon group not containing an aliphatic unsaturated bond, and a group capable of forming a cycloalkane group together with the vicinal

atom, provided that the sum of carbon atoms in $R^8$ and $R^9$ is no more than 12; and (C) a polyolefin and/or an olefinic copolymer, said polyolefin and/or olefinic copolymer (C) being contained in an amount of 1-15 parts by weight per 100 parts by weight of a resin consisting of 95-5 wt % of said liquid-crystal polyester resin (A) and 5-95 wt % of said polycarbonate resin (B).

DETAILED DESCRIPTION OF THE INVENTION

The resin composition of the present invention comprises a liquid-crystal polyester (A), a polycarbonate resin (B) and a polyolefin and/or an olefinic copolymer (C).

The liquid-crystal polyester resin (A) to be used in the present invention is a melt-processable liquid-crystal polyester resin that is capable of forming an anisotropic molten phase at a temperature not higher than 350° C. and that is obtained either by polymerizing at least two components in combination which are selected from the group consisting of a dicarboxylic acid represented by the general formula (a) HOOC—$R^1$—COOH, a diol represented by the general formula (b) HO—$R^2$—OH and an oxycarboxylic acid represented by the general formula (c) HO—$R^3$—COOH, where $R^1$, $R^2$ and $R^3$ each represents at least one group selected from among a divalent aromatic hydrocarbon group, group $R^4$—X—$R^5$ (where $R^4$ and $R^5$ are each a divalent aromatic hydrocarbon group, and X is an oxygen atom, a sulfur atom, a sulfonyl group, a carbonyl group, an alkylene group, an ester group or a direct bond), a xylylene group and a divalent aliphatic hydrocarbon group, provided that one or more hydrogen atoms in $R^1$, $R^2$, $R^3$, R[4], R[5] or on the aromatic ring of the xylylene group may be replaced by a substituent) or by homopolymerizing an oxycarboxylic acid of the general formula (c).

Preferred examples of the liquid-crystal polyester resin (A) that may be used in the present invention are listed below under (1)-(4):

(1) an aromatic polyester that has units represented by the following formulas I, II, III, IV and V, with the molar ratio of unit III to IV being in the range of from 99/1 to 70/30, and that is capable of melt molding at a temperature not higher than 350° C.:

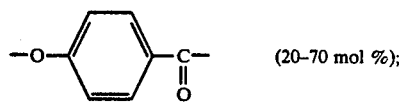 (20-70 mol %); I.

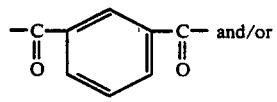 and/or II.

 (1-20 mol %);

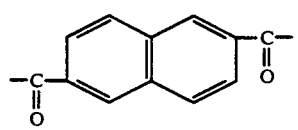 III.

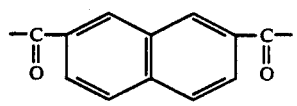 IV.

(provided that the sum of units III and IV is 3-30 mol %); and V—O—Ar—O—(4-30 mol %() where Ar represents at least one aromatic ring which may be either monocyclic or condensed;

(2) an aromatic polyester that is composed of the following units I - IV:

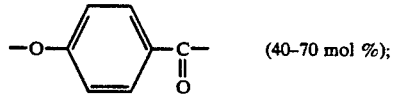 (40-70 mol %); I.

HO—Ar—OH (10-30 mol %); II.

HOOC—Ar—COOH (2-20 mol %); and III.

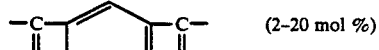 (2-20 mol %) IV.

(where Ar represents at least one aromatic ring which may be either monocyclic or condensed), that is obtained by first mixing units I and II with either one of units III and IV, heating the mixture until a conversion of 40-80% is attained, then adding the other of units III and IV, and subjecting the mixture to thermal polycondensation, and that is capable of melt molding at a temperature not higher than 350° C.; (3) an aromatic polyester that is substantially composed of units represented by the following formulas I, II, III, IV and V:

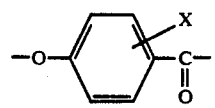 I.

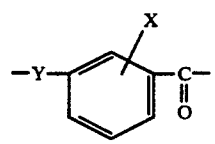 II.

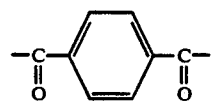 III.

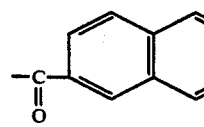 IV.

(where X is hydrogen atom, an alkyl group of $C_1$-$C_4$, an alkoxy group of $C_1$-$C_4$, an aryl group of $C_6$-$C_{10}$ or a halogen; —O—Ar—O—is a symmetric dioxy unit having at least one monocyclic or condensed aromatic ring; Y is —O—or

with units I, II, (III+IV) and V being present in respective amounts of 40-70 mol %, 1-8 mol %, 6-36 mol % and 10-40 mol % and with the molar ratio of unit III to units (III+IV) being 0.1-0.8, that has a heat deformation temperature (HDT) of at least 170° C., and that is capable of melt molding at a temperature not higher than 330° C.; and (4) a copolymerized polyester that contains the following units I - IV:

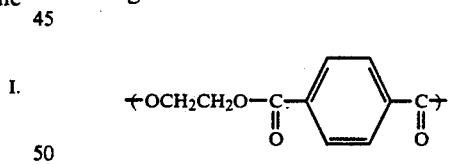 I.

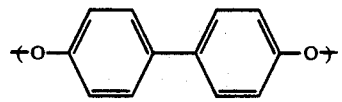 II.

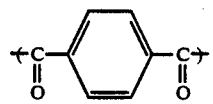 III.

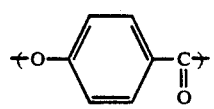 IV.

with units I, II and IV being present in respective amounts of 3-15 mol %, 5-30 mol % and 30-85 mol % of the total number of moles of the four units, and the molar ratio of unit III to II being in the range of from 0.8 to 1.1, and that is capable of melt molding at a temperature not higher than 350° C.

The copolymerized esters listed above may be used either on their own or as admixtures.

The polycarbonate resin (B) to be used in the present invention is a polyester of carbonic acid and a polyhydric alcohol or phenol and has a recurring unit represented by the following formula (b-1):

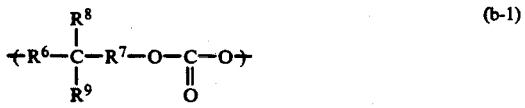
(b-1)

where $R^6$ and $R^7$ each represents at least one member selected from among naphthylene, phenylene, a halogen-substituted phenylene and an alkyl-substituted phenylene, and $R^8$ and $R^9$ each represents at least one member selected from among a hydrogen atom, a hydrocarbon group not containing an aliphatic unsaturated bond, and a group capable of forming a cycloalkane group together with the vicinal

atom, provided that the sum of carbon atoms in $R^8$ and $R^9$ is no more than 12.

Preferred polycarbonate resins include those which are derived by reaction between bisphenol A and phosgene, by reaction between bisphenol A and a diphenyl carbonate, by reaction between bisphenol A and N,N'-carbonyldiimidazole, etc. A polycarbonate obtained by reaction between bisphenol A and phosgene and which has a recurring unit represented by the following formula b-2 is particularly preferred since it has high mechanical strength and durability. This preferred polycarbonate generally contains 100-400 recurring units (b-2):

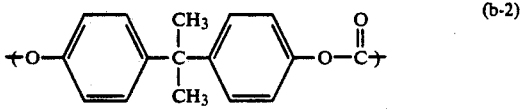
(b-2)

The polycarbonate resin is well known and is described in many patents such as U.S. Pat. Nos. 3,028,365 and 3,334,154. Thus, there is no need to describe this polycarbonate resin in detail. It preferably has an inherent viscosity of from about 0.3 to about 1.0 dl/g, more preferably from about 0.3 to about 0.45 dl/g, when measured in methylene chloride at a concentration of about 0.1 wt % at 20° C.

The polyolefin and/or olefinic copolymer (C) to be used in the present invention is described below. Any kind of polyolefins and olefinic polymers can be used in the present invention without any particular limitation but ethylenic resins containing ethylenic monomers in copolymer and styrene resins containing styrene monomers in copolymer are preferred. Preferred ethylenic resins are those which contain at least one member selected from among polyethylene, ethylene/methyl methacrylate copolymer, ethylene/ethyl acrylate copolymer, ethylene/methacrylic acid copolymer, ethylene/vinyl alcohol copolymer, ethylene/vinyl acetate copolymer, ethylene/propylene copolymer, ethylene/butene-1 copolymer, ethylene/propylene/dicyclopentadiene copolymer, ethylene/propylene/butadiene copolymer, ethylene/propylene /5-ethylidene-2-norbornene copolymer, ethylene/glycidyl methacrylate/vinyl acetate copolymer, and ethylene/maleic anhydride/acrylic acid ester copolymer. Preferred styrene resins are those which contain at least one member selected from among polystyrene, styrene/acrylonitrile copolymer, styrene/methyl methacrylate copolymer, styrene/acrylic acid copolymer, styrene/methacrylic acid copolymer, styrene/maleic anhydride copolymer and ABS resins.

Another polyolefin that can advantageously be used as component (C) is polypropylene, and another suitable olefinic copolymer is an isobutylene/maleic anhydride copolymer.

The polyolefins and/or olefinic copolymers described above may have a rubber-like polymer contained either by graft polymerization or simple blending.

The composition of the present invention contains the polyolefin and/or olefinic copolymer (C) in an amount of 1-15 parts by weight per 100 parts by weight of a resin composed of 95-5 wt % of the liquid-crystal polyester resin (A) and 5-95 wt % of the polycarbonate resin (B). Preferably, the composition contains the polyolefin and/or olefinic copolymer (C) in an amount of 1-10 parts by weight 100 parts by weight of the resin composed of 95-50 wt % of the liquid-crystal polyester resin (A) and 5-50 wt % of the polycarbonate resin (B).

If the content of the liquid-crystal polyester resin (A) exceeds 95 wt %, it is ineffective in providing improved anisotropy. If its content is less than 5 wt %, it is ineffective in improving the fluidity of the polycarbonate resin (B).

If the content of polyolefin and/or olefinic copolymer (C) is less than one part by weight per 100 parts by weight of the resin chiefly composed of the polyester resin (A) and the polycarbonate resin (B), the component (C) is ineffective in providing improved impact strength. If its content exceeds 15 parts by weight, the final composition will have lower heat resistance.

To the extent that the objects of the present invention will not be impaired, the composition of the present invention may further contain one or more of common additives such as fibrous or powdery fillers and reinforcing agents (e.g. glass fibers, carbon fibers, metal fibers, asbestos, wollastonite, potassium titanate whiskers, clay, mica, glass beads, titanium oxide, calcium carbonate, barium sulfate, gypsum, aluminum oxide, antimony oxide and talc), antioxidants/heat stabilizers, uv absorbers, lubricants/release agents, colorants containing dyes or pigments, flame retardants, flame-retarding aids, antistats and crystallization accelerators.

The production of the composition of the present invention is not limited to any particular method but it can be produced using conventional kneading machines such as a single-screw extruder, a twin-screw extruder, a Banbury mixer, a roll mill, a Brabender Plastograph, a kneader, etc. In another applicable method, the polyolefin and/or olefinic copolymer are added and mixed with a melt blend of the liquid-crystal polyester resin and the polycarbonate resin in the reaction vessel. Alternatively, the three components may be melt-mixed in a molding machine.

EXAMPLES

The following examples are provided for the purpose of further illustrating the present invention but are in no way to be taken as limiting.

(1) Preparation of test specimens

A liquid-crystal polyester resin (A), a polycarbonate resin (B) and a polyolefin and/or an olefinic copolymer (C) were charged in specified proportions into a single-screw 20 mm$\phi$ extruder (product of Thermoplastic Kogyo Co., Ltd.) and kneaded. The extrudate were cooled and cut into pellets. The pellets were fed into an injection molding machine (Model SAV-60-52 of Sanjo Seiki Seisakusho Co., Ltd.) and specimens to be tested for the following physical properties were obtained. The mold temperature was 70° C. and injection pressure was 250 kg/cm$^2$. The cylinder temperature was such that the mold was completely filled with the resin.

(2) Bending test

Conducted in accordance with ASTM D790.

(3) Thermal deformation test (HDT)

Conducted in accordance with ASTM D648 under a load of 18.6 kg/cm$^2$.

(4) Izod impact test (with notch)

Conducted in accordance with ASTM D256.

EXAMPLES 1-5

Liquid-crystal polyester resin (A) having the units described below (LCP-1, already known by being described in Japanese Patent Application No. 62-332516), polycarbonate resin (B) (NOVAREX 7025A of Mitsubishi Kasei Corp.) and polystyrene resin (C) (DIC Styrene UX-560 of Dainippon Ink & Chemicals, Inc.) were mixed in the proportions shown in Table I-1, pelletized, injection molded and evaluated for physical properties.

Units in LCP-1:

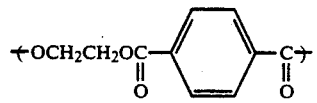 a

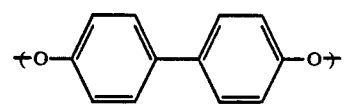 b

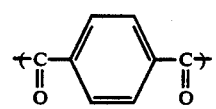 c

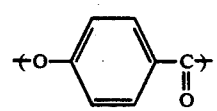 d where the molar ratio of a/b/c/d was 13/8/8/71. When a weak shear force was applied to resin (A) in the molten state, it was found to exhibit optical anisotropy under observation with a polarizing microscope (Model POH of Nikon Corp. equipped with a heat stage). The results of evaluations of the physical properties of the molded articles are shown in Table I-1.

Comparative Examples 1-4

The liquid-crystal polyester resin (A), polycarbonate resin (B) and optionally polystyrene resin (C) which were used in Example 1 were mixed in the proportions shown in Table I-2, pelletized, injection molded and evaluated for physical properties. The results are shown in Table I-2.

EXAMPLES 6-22

The liquid-crystal polyester resin (A) and polycarbonate resin (B) which were used in Example 1, and the polyolefin and/or olefinic copolymer shown in Tables I-1 and I-2 were mixed in the proportions shown in the same tables, pelletized, injection molded and evaluated for physical properties. The results are shown in Tables I-1 and I-2.

TABLE I

| | Recipe | | | | Bending test | | | Izod |
|---|---|---|---|---|---|---|---|---|
| | liquid-crystal polyester resin (A)(a), parts by weight | polycarbonate resin (B), parts by weight | polyolefin and/or olefinic copolymer (C), parts by weight | Polyolefin and/or olefinic copolymer (C) | flexural strength, kg/cm$^2$ | flexural modulus, kg/cm$^2$ | HDT, °C. | impact strength, kg · cm/cm |
| Example No. | | | | | | | | |
| 1 | 95 | 5 | 5 | polystyrene (b) | 1400 | 130,000 | 200 | 35 |
| 2 | 70 | 30 | 1 | " | 1350 | 110,000 | 160 | 30 |
| 3 | 70 | 30 | 5 | " | 1330 | 108,000 | 158 | 28 |
| 4 | 70 | 30 | 10 | " | 1300 | 105,000 | 151 | 27 |
| 5 | 50 | 50 | 5 | " | 1000 | 90,000 | 130 | 12 |
| 6 | 70 | 30 | 5 | high impact strength polystyrene (c) | 1370 | 112,000 | 157 | 30 |
| 7 | 70 | 30 | 5 | styrene/methyl methacrylate copolymer (d) | 1370 | 107,000 | 158 | 26 |
| 8 | 70 | 30 | 5 | styrene/maleic anhydride copolymer (e) | 1350 | 105,000 | 155 | 22 |
| 9 | 70 | 30 | 5 | styrene/methacrylic acid copolymer (f) | 1270 | 104,000 | 152 | 17 |
| 10 | 70 | 30 | 5 | ABS resin (g) | 1300 | 110,000 | 153 | 22 |
| 11 | 70 | 30 | 5 | styrene/acrylo- | 1290 | 109,000 | 157 | 20 |

TABLE I-continued

| | Recipe | | | | Bending test | | | |
|---|---|---|---|---|---|---|---|---|
| | liquid-crystal polyester resin (A)(a), parts by weight | polycarbonate resin (B), parts by weight | polyolefin and/or olefinic copolymer (C), parts by weight | Polyolefin and/or olefinic copolymer (C) | flexural strength, kg/cm$^2$ | flexural modulus, kg/cm$^2$ | HDT, °C. | Izod impact strength, kg·cm/cm |
| | | | | nitrile copolymer (h) | | | | |
| 12 | 70 | 30 | 5 | low-density polyethylene (i) | 1300 | 140,000 | 152 | 21 |
| 13 | 70 | 30 | 5 | high-density polyethylene (j) | 1310 | 107,000 | 153 | 26 |
| 14 | 70 | 30 | 5 | ethylene/methacrylic acid copolymer (k) | 1290 | 110,000 | 156 | 19 |
| 15 | 70 | 30 | 5 | ethylene/vinyl acetate copolymer (l) | 1310 | 118,000 | 154 | 20 |
| 16 | 70 | 30 | 5 | ethylene/vinyl alcohol copolymer (m) | 1250 | 109,000 | 154 | 23 |
| 17 | 70 | 30 | 5 | ethylene/ethyl acrylate copolymer (n) | 1280 | 105,000 | 153 | 20 |
| 18 | 70 | 30 | 5 | ethylene/propylene/butadiene copolymer (o) | 1300 | 108,000 | 155 | 18 |
| 19 | 70 | 30 | 5 | ethylene/glycidyl methacrylate/vinyl acetate copolymer (p) | 1320 | 112,000 | 159 | 19 |
| 20 | 70 | 30 | 5 | ethylene/maleic anhydride/acrylic acid ester copolymer (q) | 1340 | 108,000 | 156 | 21 |
| 21 | 70 | 30 | 5 | ethylene/methyl methacrylate copolymer (r) | 1320 | 110,000 | 154 | 20 |
| 22 | 70 | 30 | 5 | polypropylene (s) | 1250 | 103,000 | 152 | 19 |
| Comparative Example | | | | | | | | |
| 1 | 95 | 5 | 0 | — | 1400 | 129,000 | 197 | 28 |
| 2 | 70 | 30 | 0 | — | 1350 | 110,000 | 150 | 9 |
| 3 | 70 | 30 | 20 | polystyrene (b) | 950 | 90,000 | 120 | 10 |
| 4 | 50 | 50 | 0 | — | 900 | 87,000 | 130 | 5 |

Notes:
(a) LCP-1 (Japanese Patent Application No. 62-332516)
(b) DIC Styrene UX-560 of Dainippon Ink & Chemicals, Inc.
(c) HI Stylon 490 of Asahi Chemical Industry Co., Ltd.
(d) Estyrene MS-200 of Nippon Steel Chemical Co., Ltd.
(e) Dylark #232 of Sekisui Plastics Co., Ltd.
(f) Ryulex A-15 of Dainippon Ink & Chemicals, Inc.
(g) Stylac ABS-200 of Asahi Chemical Industry Co., Ltd.
(h) Stylac AS-767 of Asahi Chemical Industry Co., Ltd.
(i) Mirason 401 of Mitsui Petrochemical Industries, Ltd.
(j) Hi-zex 2200J of Mitsui Petrochemical Industries, Ltd.
(k) Nucrel 403 of Mitsui Petrochemical Industries, Ltd.
(l) Evatate D3021 of Sumitomo Chemical Co., Ltd.
(m) Soarlite M of The Nippon Synthetic Chemical Industry Co., Ltd.
(n) EEA A-701 of Mitsui Petrochemical Industries, Ltd.
(o) Mitsui EPT #3070 of Mitsui Petrochemical Industries, Ltd.
(p) Bondfast E of Sumitomo Chemical Co., Ltd.
(q) Bondine HX-8020 of Sumika CDF Co., Ltd.
(r) Acrift WK 402 of Sumitomo Chemical Co., Ltd.
(s) Noblen W-101 of Sumitomo Chemical Co., Ltd.

EXAMPLE 23

Liquid-crystal polyester resin (A) having the units described below (LCP-2, already known by being described in Japanese Patent Public Disclosure (KOKAI) No. 62-207328) and the polycarbonate resin (B) and polyolefin and/or olefinic copolymer (C) which were used in Example 1 were mixed in the proportions shown in Table II, pelletized, injection molded and evaluated for physical properties.

Units in LCP-2:

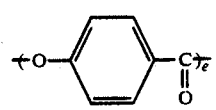

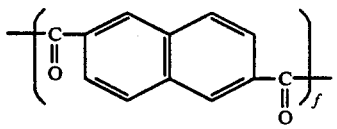

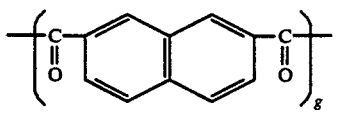

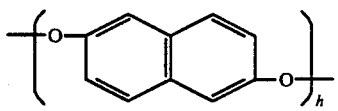

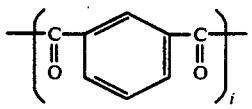

where the molar ratio of e/f/g/h/i was 60/10/2/20/8. When a weak shear force was applied to resin (A) in the molten state, it was fond to exhibit optical anisotropy under observation with a polarizing microscope (Model POH of Nikon Corp. equipped with a heat stage). The results of evaluations of the physical properties of the molded article are shown in Table II.

COMPARATIVE EXAMPLE 5

The liquid-crystal resin (A) and polycarbonate resin (B) which were used in Example 23 were mixed in the proportions shown in Table II, pelletized, injection molded and evaluated for physical properties. The results are shown in Table II.

EXAMPLE 24

Liquid-crystal polyester resin (A) having the units described below (LCP-3, already known by being described in Japanese Patent Public Disclosure (KOKAI) No. 62-207327) and the polycarbonate resin (B) and polyolefin and/or olefinic copolymer (C) which were used in Example 1 were mixed in the proportions shown in Table II, pelletized, injection molded and evaluated for physical properties.
Units in LCP-3:

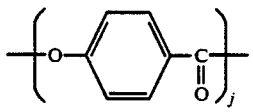

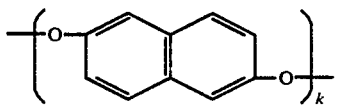

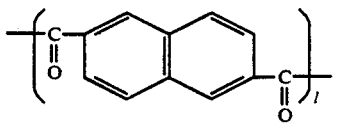

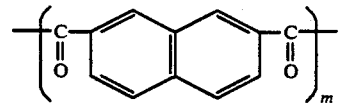

where the molar ratio of j/k/l/m was 60/20/10/10. When a weak shear force was applied to resin (A) in the molten state, it was found to exhibit optical anisotropy under observation with a polarizing microscope (Model POH of Nikon Corp. equipped with a heat stage). The results of evaluations of the physical properties of the molded article are shown in Table II.

COMPARATIVE EXAMPLE 6

The liquid-crystal polyester resin (A) and polycarbonate resin (B) which were used in Example 24 were mixed in the proportions shown in Table II, pelletized, injection molded and evaluated for physical properties. The results are shown in Table II.

EXAMPLE 25

Liquid-crystal polyester resin (A) having the units described below (LCP-4, already known by being described in Japanese Patent Public Disclosure (KOKAI) No. 63-284221) and the polycarbonate resin (B) and polyolefin and/or olefinic copolymer (C) which were used in Example 1 were mixed in the proportions shown in Table II, pelletized, injection molded and evaluated for physical properties.
Units in LCP-4:

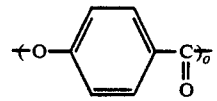

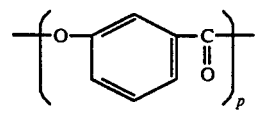

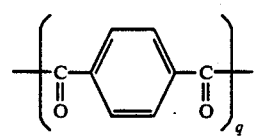

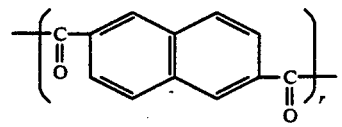

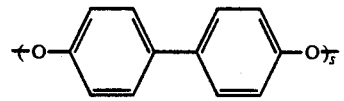

where the molar ratio of o/p/q/r/s was 60/3/9.25/9.25/18.5. When a weak shear force was applied to resin (A) in the molten state, it was found to exhibit optical anisotropy under observation with a polarizing microscope (Model POH of Nikon Corp. equipped with a heat stage). The results of evaluations of the physical properties of the molded article are shown in Table II.

COMPARATIVE EXAMPLE 7

The liquid-crystal polyester resin (A) and polycarbonate resin (B) which were used in Example 25 were mixed in the proportions shown in Table II, pelletized, injection molded and evaluated for physical properties. The results are shown in Table II.

EXAMPLE 26

Liquid-crystal polyester resin (A) having the units described below (LCP-5, already known by being described in U.S. Pat. No. 4,161,470) and the polycarbonate resin (B) and polystyrene resin (C) which were used in Example 1 were mixed in the proportions shown in Table II, pelletized, injection molded and evaluated for physical properties. Units in LCP-5:

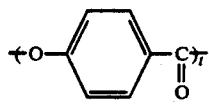

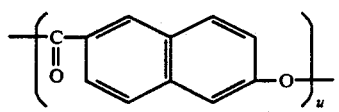

where the molar ratio of t/u was 70/30. When a weak shear force was applied to resin (A) in the molten state, it was found to exhibit optical anisotropy under observation with a polarizing microscope (Model POH of Nikon Corp. equipped with a heat stage). The results of evaluations of the physical properties of the molded particle are shown in Table II.

COMPARATIVE EXAMPLE 8

The liquid-crystal polyester resin (A) and polycarbonate resin (B) which were used in Example 26 were mixed in the proportions shown in Table II, pelletized, injection molded and evaluated for physical properties. The results are shown in Table II.

EXAMPLE 27

Liquid-crystal polyester resin (A) having the units described below (LCP-6, already known by being described in Japanese Patent Publication No. 56-18016) and the polycarbonate resin (B) and polystyrene resin (C) which were used in Example 1 were mixed in the proportions shown in Table II, pelletized, injection molded and evaluated for physical properties.

Units IN LCP-6:

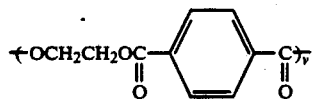

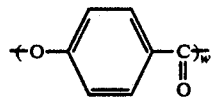

where the molar ratio of v/w was 40/60. When a weak shear force was applied to resin (A) in the molten state, it was found to exhibit optical anisotropy under observation with a polarizing microscope (Model POH of Nikon Corp. equipped with a heat stage). The results of evaluation of the physical properties of the molded article are shown in Table II.

COMPARATIVE EXAMPLE 9

The liquid-crystal polyester resin (A) and polycarbonate resin (B) which were used in Example 27 were mixed in the proportions shown in Table II, pelletized, injection molded and evaluated for physical properties. The results are shown in Table II.

The data in Tables I and II show that compared to the blends of two components, liquid-crystal polyester resin (A) and polycarbonate resin (B), the three-component blends of the present invention which contained a polyolefin and/or olefinic copolymer (C) in addition to (A) and (B) had higher impact strength and yet the stiffness and heat resistance of the two-component blends were substantially retained.

TABLE II

| Example No. | The type of liquid-crystal polyester resin (A) | Liquid-crystal polyester resin (A), parts by weight | Polycarbonate resin (B), parts by weight | Polyolefin and/or olefinic copolymer (C), parts by weight | The type of polyolefin and/or olefinic copolymer (C) | Bending test flexural strength, kg/cm² | Bending test flexural modulus, kg/cm² | HDT, °C. | Izod impact strength, kg·cm/cm |
|---|---|---|---|---|---|---|---|---|---|
| 23 | (t) | 70 | 30 | 5 | polystyrene (b) | 1400 | 120,000 | 160 | 40 |
| 24 | (u) | 70 | 30 | 5 | polystyrene (b) | 1380 | 115,000 | 165 | 35 |
| 25 | (v) | 70 | 30 | 5 | polystyrene (b) | 1400 | 118,000 | 163 | 37 |
| Comparative Example 5 | (t) | 70 | 30 | 0 | — | 1400 | 120,000 | 155 | 12 |
| 6 | (u) | 70 | 30 | 0 | — | 1350 | 110,000 | 150 | 10 |
| 7 | (v) | 70 | 30 | 0 | — | 1350 | 109,000 | 150 | 10 |
| 26 | (w) | 70 | 30 | 5 | polystyrene (b) | 1400 | 110,000 | 160 | 32 |
| 27 | (x) | 70 | 30 | 5 | polystyrene (b) | 1300 | 100,000 | 150 | 30 |
| Comparative Example 8 | (w) | 70 | 30 | 0 | — | 1400 | 110,000 | 158 | 8 |

TABLE II-continued

| The type of liquid-crystal polyester resin (A) | Liquid-crystal polyester resin (A), parts by weight | Polycarbonate resin (B), parts by weight | Polyolefin and/or olefinic copolymer (C), parts by weight | The type of polyolefin and/or olefinic copolymer (C) | Bending test flexural strength, kg/cm² | Bending test flexural modulus, kg/cm² | HDT, °C. | Izod impact strength, kg·cm/cm |
|---|---|---|---|---|---|---|---|---|
| 9 | (x) | 70 | 30 | 0 | — | 1300 | 100,000 | 148 | 11 |

Notes:
(t) LCP-2 (Japanese Patent Public Disclosure No. 62-207328)
(u) LCP-3 (Japanese Patent Public Disclosure No. 62-207327)
(v) LCP-4 (Japanese Patent Public Disclosure No. 62-284221)
(w) LCP-5 (U.S. Pat. No. 4,161,470)
(x) LCP-6 (Japanese Patent Publication No. 56-18016)

The present invention provides an improved resin composition that is balanced between various physical properties including moldability, heat resistance, impact resistance, dimensional stability and stiffness. Hence, the resin composition is most suitable for use in such applications as electronics parts, heat-resistant tableware and automotive parts, where the improved features described above are fully utilized.

We claim:

1. A resin composition consisting essentially of:
(A) a melt-processable liquid-crystal polyester resin which is capable of forming an anisotropic melt phase at a temperature of not higher than 350° C. and which is obtained either by polymerizing at least two components selected from the group consisting of a dicarboxylic acid represented by general formula (a):

HOOC—R¹—COOH          (a), a diol represented by general formula (b):

HO—R²—OH             (b), and an oxycarboxylic acid represented by general formula (c):

HO—R³—COOH           (c);

or by homopolymerizing the oxycarboxylic acid of general formula (c);
wherein R¹, R² and R³ independently represent at least one group selected from the group consisting of a divalent aromatic hydrocarbon group, a group represented by the general formula:

R⁴-X-R⁵, xylylene group and a divalent aliphatic hydrocarbon group; wherein R⁴ and R⁵ are independently a divalent aromatic hydrocarbon group, and X is a member selected from the group consisting of oxygen atom, sulfur atom, sulfonyl group, carbonyl group, an alkylene group, an ester group and a direct bond; provided that at least one hydrogen atom on the aromatic ring of R¹, R², R³, R⁴, R⁵ and the xylylene may be substituted;

(B) a polycarbonate resin having a recurring unit represented by the general formula:

$$-(R^6-\underset{\underset{R^9}{|}}{\overset{\overset{R^8}{|}}{C}}-R^7-O-\underset{\underset{O}{\|}}{C}-O)-$$

wherein R⁶ and R⁷ independently represent a member selected from the group consisting of napthylene, phenylene, a halogen-substituted phenylene and an alkyl-substituted phenylene; and R⁸ and R⁹ either independently represent a member selected from the group consisting of hydrogen atom and a hydrocarbon atom free of an aliphatic unsaturated bond or together represent a residue which is capable of forming a cycloalkane group with the $$-\underset{|}{\overset{|}{C}}-$$

atom; provided that the total number of the carbon atoms in R⁸ and R⁹ is no more than 12; and (C) at least one impact modifier selected from the group consisting of a polymer consisting of polystyrene, a copolymer consisting of styrene-acrylonitrile, a copolymer consisting of styrene-methyl methacrylate, a copolymer consisting of styrene-acrylic acid, a copolymer consisting of styrene-methacrylic acid, and a copolymer consisting of styrene-maleic anhydride;

said component (C) being contained in an amount of 1 to 15 parts by weight per 100 parts by weight of a resin consisting of 95 to 5% by weight of said liquid-crystal polyester resin (A) and 5 to 95% by weight of said polycarbonate resin (B).

2. A resin composition according to claim 1, containing additives selected from the group consisting of fillers, reinforcing agents, antioxidants, heat stabilizers, UV absorbers, lubricants, release agents, colorants, flame retardants, flame-retarding aids, anti-stats and crystallization accelerators.

3. A resin composition according to claim 1, wherein said component (C) is polystyrene.

4. A resin composition according to claim 1, wherein said component (C) is styrene-acrylonitrile copolymer.

5. A resin composition according to claim 1, wherein said component (C) is styrene-methyl methacrylate copolymer.

6. A resin composition according to claim 1, wherein said component (C) is styrene-acrylic acid copolymer.

7. A resin composition according to claim 1, wherein said component (C) is styrene-methacrylic acid copolymer.

8. A resin composition according to claim 1, wherein said component (C) is styrene-maleic anhydride copolymer.

9. A method for improving the impact strength of a polyester/polycarbonate resin composition, consisting essentially of the step of adding to said composition at least one impact modifier selected from the group consisting of a polymer consisting of polystyrene, a copolymer consisting of styrene-acrylonitrile, a copolymer consisting of styrene-acrylic acid, a copolymer consisting of styrene-methacrylic acid, and a copolymer consisting of styrene-maleic anhydride, said composition consisting essentially of:

(a) a melt-processable liquid-crystal polyester resin which is capable of forming an anisotropic melt phase at a temperature of not higher than 350° C. and which is obtained either by polymerizing at least two components selected from the group consisting of a dicarboxylic acid represented by general formula (a):

HOOC-R$^1$-COOH  (a), a diol represented by general formula (b):

HO-R$^2$-OH  (b), and an oxycarboxylic acid represented by general formula (c):

HO-R$^3$COOH  (c);

or by homopolymerizing the oxycarboxylic acid of general formula (c);
wherein R$^1$, R$^2$ and R$^3$ independently represent at least one group selected from the group consisting of a divalent aromatic hydrocarbon group, a group represented by the general formula:

R$^4$-X-R$^5$, xylylene group and a divalent aliphatic hydrocarbon group; wherein R$^4$ and R$^5$ are independently a divalent aromatic hydrocarbon group, and X is a member selected from the group consisting of oxygen atom, sulfur atom, sulfonyl group, carbonyl group, an alkylene group, an ester group and a direct bond; provided that at least one hydrogen atom on the aromatic ring of R$^1$, R$^2$, R$^3$, R$^4$, R$^5$ and the xylylene may be substituted; and (B) a polycarbonate resin having a recurring unit represented by the general formula:

$$-(R^6-\underset{\underset{R^9}{|}}{\overset{\overset{R^8}{|}}{C}}-R^7-O-\overset{\overset{}{\|}}{\underset{\underset{O}{}}{C}}-O)-$$

wherein R$^6$ and R$^7$ independently represent a member selected from the group consisting of napthylene, phenylene, a halogen-substituted phenylene and an alkyl-substituted phenylene; and R$^8$ and R$^9$ either independently represent a member selected from the group consisting of hydrogen atom and a hydrocarbon atom free of an aliphatic unsaturated bond or together represent a residue which is capable of forming a cycloalkane group with the $$-\underset{|}{\overset{|}{C}}-$$

atom; provided that the total number of the carbon atoms in R$^8$ and R$^9$ is no more than 12; and
wherein said impact modifier is added to said composition in an amount of 1 to 15 parts by weight per 100 parts by weight of a resin consisting of 95 to 5% by weight of said liquid-crystal polyester resin (A) and 5 to 95% by weight of said polycarbonate resin (B).

* * * * *

UNITED STATES PATENT AND TRADEMARK OFFICE
CERTIFICATE OF CORRECTION

PATENT NO.  : 5,242,981
DATED       : September 7, 1993
INVENTOR(S) : Mitsuhiko Izumi, Kenji Yoshino and Tadahiro Wakui It is certified that error appears in the above-indentified patent and that said Letters Patent is hereby corrected as shown below:

Claim 1, col. 16, line 21, change "atom" to --group--.
Claim 1, col.18, line 21, change "atom" to --group--.

Signed and Sealed this

Third Day of May, 1994

Attest:

BRUCE LEHMAN

Attesting Officer

Commissioner of Patents and Trademarks